United States Patent Office 2,997,470
Patented Aug. 22, 1961

2,997,470
LYSERGIC ACID AMIDES
Richard P. Pioch, Indianapolis, Ind., assignor to Eli Lilly and Company, Indianapolis, Ind., a corporation of Indiana
No Drawing. Filed Mar. 5, 1956, Ser. No. 569,242
8 Claims. (Cl. 260—247.2)

This invention relates to novel amides of lysergic acid which can be represented by the formula

RCO—$R_1$ wherein RCO— represents the lysergoyl radical and $R_1$ represents an amido radical of the group consisting of isopropylamido, sec-butylamido, neopentylamido, t-butylamido, monocycloalkylamido, monohydroxy-substituted monocycloalkylamido, lower alkyl-substituted anilido, lower alkoxy-substituted anilido, halo-substituted anilido, methyl propyl amido, diisopropylamido, lower alkoxyalkylamido, pyrrolidido, lower alkyl-substituted pyrrolidido, morpholido, piperidido, lower alkyl-substituted piperidido, pyridylamido, N'-alkyl-piperazido, 1,1-dimethylethanolamido, 2,2-dimethylethanolamido, 1,2-dimethylethanolamido, 1-hydroxy-3-methylbutyl-2-amido and 1-hydroxy-2-methylbutyl-2-amido radicals.

The compounds of the present invention are characterized by one or more of several utilities as evinced by their physiological action. Certain of the compounds, such as, for example $d$-lysergic acid N-$dl$-trans-2-hydroxycyclopentyl amide, $d$-isolysergic acid N-$dl$-trans-2-hydroxycyclopentyl amide, $d$-lysergic acid N-D-threo-3-hydroxybutyl-2 amide, $d$-lysergic acid N-L-threo-3-hydroxybutyl-2- amide, $d$-lysergic acid o-methylanilide, $d$-lysergic acid N-sec-butyl amide, $d$-lysergic acid N-cyclopentyl amide and $d$-lysergic acid N-cyclohexyl amide have oxytocic action of the character of ergonovine, while others can be employed as intermediates for the preparation of compounds having oxytocic action. Certain others of the compounds, for example, $d$-lysergic acid N-methyl N-isopropyl amide, $d$-lysergic acid N-t-butyl amide and $d$-lysergic acid morpholide, are useful for the study of mental disease and in psychotherapy, in that they can be used to elicit characteristic rage patterns, to induce hallucinations and so forth. Others of the compounds, for example $d$-lysergic acid N-isopropyl amide and $d$-lysergic acid N-$\beta$-methoxyethyl amide, when dispersed in a pharmaceutical extending medium and injected parenterally, have useful physiological action in lowering mammalian blood pressure. Again, others of the compounds, for example, $d$-lysergic acid p-methoxyanilide, have pressor activity when likewise injected parenterally, while still others, as exemplified by $d$-lysergic acid pyrrolidide, $d$-lysergic acid morpholide and $d$-lysergic acid N-t-butyl amide, have hypothermic and antihypothalamic activity; and further compounds illustrated by $d$-lysergic acid N-methyl N-isopropyl amide and $d$-lysergic acid N-neopentyl amide produce an antiserotonin effect in that they inhibit certain of the characteristic responses elicited by serotonin. The compounds specifically mentioned in connection with physiological activity are intended to be illustrative only and are not to be construed as restricting the scope of the invention in any way.

Broadly speaking, lysergic acid amides such as the new compounds of the invention can be prepared by methods described in U.S. Patents Nos. 2,090,429 and 2,090,430. However, it is preferred to prepare the new lysergic acid amides by the process described in my U.S. Patent No. 2,736,728, issued February 28, 1956. In this process, lysergic acid is caused to react with trifluoroacetic anhydride to produce a mixed anhydride of lysergic and trifluoroacetic acids, which is then condensed with a primary or secondary amine which provides the amido radical described hereinabove. The resulting lysergic acid amide can be isolated from the resulting reaction mixture and purified according to the methods well known in the art, as, for example, by extraction procedures and by chromatographic separation employing aluminum oxide columns and selective eluents.

The novel amides of the invention are capable of forming acid addition salts owing to the presence in the lysergic acid residue of a tertiary amino nitrogen atom. Such salts can be employed for purposes of isolating the compounds from reaction mixtures and for purifying the compounds. Examples of the acids useful for the preparation of acid addition salts of the novel lysergic acid amides are mineral acids, such as hydrochloric, nitric and phosphoric acids; and organic acids such as maleic, stearic, tartaric, benzoyl-tartaric, citric, salicylic, benzoic, and phthalic acids and the like. The desired acid addition salts are readily prepared by the methods known to the art, as, for example, by reaction of equivalent amounts of the lysergic acid amide and the acid in mutual inert solvent solution, followed by evaporation of the solvent under mild conditions. Preferably the pharmaceutically useful acid addition salts are prepared, i.e., salts of acids which do not substantially increase the toxicity of the compounds, and which are compatible with the various pharmaceutical extending media.

Illustrative compounds which are included within the scope of the invention are the following: lysergic acid N-isopropyl amide, lysergic acid N-neopentyl amide, lysergic acid N-cyclohexyl amide, lysergic acid N-4-hydroxycyclohexyl amide, lysergic acid N-2-hydroxycycloheptyl amide, lysergic acid N-2-hydroxycyclooctyl amide, lysergic acid p-ethylanilide, lysergic acid p-n-propoxyanilide, lysergic acid p-bromoanilide, lysergic acid o-chloroanilide, lysergic acid N,N-diisopropyl amide, lysergic acid N-methyl N-isopropyl amide, lysergic acid N-$\gamma$-propoxypropyl amide, lysergic acid N-$\beta$-methoxy-n-propyl amide, lysergic acid 2,5-dimethylpyrrolidide, lysergic acid 2,4,5-trimethylpyrrolidide, lysergic acid 2-ethylpyrrolidide, lysergic acid N-1,1-dimethylethanol amide, lysergic acid N-2,2-dimethylethanol amide, lysergic acid N-3-hydroxypropyl amide, lysergic acid piperidide, lysergic acid N-erythro-1,2-dimethylethanol amide, lysergic acid valinol amide, lysergic acid piperazide, lysergic acid 4-methylpiperazide, lysergic acid lupetazide, lysergic acid 2,4,6-trimethylpiperidide, lysergic acid 2-ethylpiperidide, lysergic acid 2-amylpiperidide, lysergic acid N-2,2-dimethylbutan-4-ol amide, lysergic acid N-pyridyl-4 amide, lysergic acid N-2-methylpyridyl-5 amide, lysergic acid N-1-methoxypropyl-2 amide, lysergic acid N-$\beta$-tetrahydrofuryl amide, lysergic acid N-2-tetrahydrofurylmethyl amide, lysergic acid 2,4-dichloroanilide, lysergic acid N-homoveratryl amide and lysergic acid 2-methoxy-5-methylanilide.

Conveniently, for the purpose of eliciting the physiological action of the compounds of the present invention, the bases or pharmaceutically useful acid addition salts of the bases are incorporated into pharmaceutical extending media to produce compositions which can be administered orally or parenterally. Thus tablets, capsules or powders can be made containing the compounds in solid form for oral administration. Similarly, liquid preparations, such as suspensions, dispersions, tinctures, elixirs or solutions can be prepared for oral or parenteral use. When the compounds are to be prepared in sterile form, sterilization by filtration through sterilizing filters and the like is preferred to heat sterilization since the latter too often produces irreversible changes in complex organic molecules of the nature of the compounds of the invention.

In carrying out the process for the preparation of the new compounds, it should be noted that whenever solutions containing lysergic acid or its derivatives are prepared, they are preferably kept cool and protected from light. As is well known, compounds containing the lysergic acid structure are unstable in the presence of heat, light and air and may undergo irreversible decomposition even to the extent of forming dark colored products which are difficult to remove during the purification of the desired end products. It is likewise known that in the course of the preparation of derivatives of lysergic acid a mixture of the isomeric lysergic and isolysergic acid derivatives are commonly formed. A separation of these isomers is readily effected chromatographically. Conveniently, columns of aluminum oxide, ion-exchange resin or the like are employed, and the mixture of isomers is placed upon the column using a suitable solvent. The desired products are then separated by elution with other and more polar solvents or solvent mixtures. The eluates containing the individual isomers can be evaporated to dryness and the residue crystallized in the usual way by dissolving it in a minimum amount of warm solvent and cooling. The isomers can be re-chromatographed as such or in the form of an acid addition salt for further purification. Alternatively, the mixture of isomers resulting from the process of preparation of the new compounds can be separated by evaporating the reaction mixture to dryness, redissolving the residue in a suitable water-immiscible solvent and washing the solution with water to remove unreacted lysergic acid in the form of an amine salt. After evaporation of the solvent, the residue is converted to an acid addition salt, such as the maleic acid addition salt, of the lysergic acid amide, and then the lysergic acid amide salt is separated from the isolysergic acid amide salt by fractional crystallization. The processes of separation of mixtures of isomers and purification by chromatography are readily followed by color tests such as the Van Urk test, or, more simply, by examination under ultraviolet light which causes marked fluorescence of the compounds.

The following examples more specifically illustrate the preparation of the novel amides of lysergic acid which are included within the scope of the invention.

EXAMPLE 1

*Preparation of d-lysergic acid morpholide*

A solution containing 0.02 mol of the mixed anhydride of $d$-lysergic acid and trifluoroacetic acid is prepared as follows: A suspension of 0.02 mol of $d$-lysergic acid in 225 ml. of acetonitrile previously cooled to $-20°$ C. is mixed with a solution of 0.042 mol of trifluoroacetic acid anhydride in 100 ml. of acetonitrile also previously cooled to $-20°$ C., and 0.2 mol of finely divided magnesium oxide are added. The reaction mixture is kept at $-20°$ C. for about one and one-half hours, whereupon the suspended $d$-lysergic acid dissolves and the mixed anhydride of lysergic acid and trifluoroacetic acid is formed.

The mixed anhydride solution is then added to 0.104 mol of morpholine dissolved in 150 ml. of acetonitrile maintained at room temperature. The reaction mixture is allowed to stand for one and one-fourth hours in the dark. The solvents are thereafter evaporated in vacuo and the resulting residue, comprising lysergic acid morpholide, is dissolved in 400 ml. of chloroform. The chloroform solution is washed twelve times with 50 ml. portions of water, dried over anhydrous sodium sulfate and the chloroform is evaporated in vacuo. The resulting dark brown residue is dissolved in 20 ml. of anhydrous methanol and a solution containing 1.2 g. of maleic acid in 5 ml. of methanol is added thereto, whereupon the maleate salt of the $d$-lysergic acid morpholide is formed. Twenty-five milliliters of anhydrous diethyl ether are then added carefully; the mixture is kept overnight at 0° C. and thereafter is allowed to stand at room temperature for a short time. The crystals slowly deposited over this period are filtered off and are quickly washed with a cold mixture of one part of methanol and two parts of diethyl ether. After drying, the maleate salt, of $d$-lysergic acid morpholide thus prepared melts at about 205–207° C. with decomposition and weighs 870 mg.

*Analysis.*—Calculated for $C_{24}H_{27}N_3O_6$: C, 63.56; H, 6.00; N, 9.27. Found: C, 63.22; H, 5.75; N, 9.04.

The maleate salt is dissolved in a minimum volume of water and neutralized with sodium carbonate. The resulting mixture is extracted with three 100 ml. portions of chloroform, the combined chloroform extracts are dried with sodium sulfate, are filtered, and are evaporated to dryness in vacuo. The residue is taken up in a small volume of benzene and cooled, whereupon crystals of $d$-lysergic acid morpholide are formed.

The combined filtrate and washings from the isolation of $d$-lysergic acid morpholide acid maleate are evaporated to dryness. The acid maleate salt of $d$-isolysergic acid morpholide contained in the residue is dissolved in water, is converted to the corresponding free base by treatment with sodium carbonate and is extracted with chloroform as set forth hereinabove. The chloroform solution containing the free base is evaporated to small volume, is placed on a column of 50 g. of basic alumina and is chromatographed using a 1:1 benzene-chloroform mixture as the eluant. The fractions of the eluate giving a positive Van Urk test are combined and are evaporated to dryness. Crystallization of the resulting residue from acetone yields about 550 mg. of $d$-isolysergic acid morpholide melting at about 199–200° C. with decomposition.

EXAMPLE 2

*Preparation of d-lysergic acid N-isopropyl amide*

A solution containing 0.01 mol of the mixed anhydride of $d$-lysergic and trifluoroacetic acids in 160 ml. of acetonitrile is prepared as follows: 0.01 mol of $d$-lysergic acid is dissolved in 100 ml. of acetonitrile, and a solution of 0.021 mol of trifluoroacetic acid anhydride in 60 ml. of of acetonitrile is added thereto. The temperature is maintained between about $-20°$ C. to $-18°$ C. for about one and one-half hours while the reaction is proceeding to completion. The reaction mixture containing the mixed anhydride is added to a solution of 0.052 mol of anhydrous isopropyl amine in 100 ml. of acetonitrile. The mixture is allowed to stand at room temperature in the dark for about one hour. At the end of this time the reaction mixture is evaporated to dryness in vacuo, leaving a residue comprising a mixture of both the "normal" and "iso" $d$-lysergic acid N-isopropyl amides. This residue is dissolved in about 200 ml. of chloroform and is washed about ten times with successive 25 ml. portions of water. The chloroform layer is separated, is dried over anhydrous sodium sulfate; the drying agent is removed by filtration; and the chloroform is evaporated in vacuo. The residue, comprising a mixture of purified $d$-lysergic acid and $d$-isolysergic acid N-isopropyl amides, is dissolved in methanol, and 0.375 g. of maleic acid dissolved in 2 ml. of methanol is added thereto. Twenty-five milliliters of diethyl ether are cautiously added upon which fine, needle-like crystals of $d$-lysergic acid N-isopropyl amide acid maleate begin to precipitate. The $d$-lysergic acid N-isopropyl amide acid maleate is filtered off and dried. About 610 mg. of the salt, melting at about 209–210° C. with decomposition, are obtained.

*Analysis.*—Calculated for $C_{23}H_{27}N_3O_5$: C, 64.92; H, 6.40; N, 9.88. Found: C, 65.19; H, 6.72; N, 10.01.

The mother liquors from the isolation of the $d$-lysergic acid N-isopropyl amide acid maleate are evaporated to dryness and the $d$-isolysergic acid N-isopropyl amide acid maleate contained therein is converted to the corresponding free base by the method disclosed in Example 1; and after isolation, the base is chromatographed over a column of about 60 g. of basic alumina, using 250 ml. of a 17:3 benzene-chloroform mixture to develop the chromatogram. The *d*-isolysergic acid N- isopropyl amide is then eluted by the use of 140 ml. of a 1:1 chloroform-benzene mixture. The *d*-isolysergic acid N-isopropyl amide thus obtained melts at about 201–202° C. with decomposition, after crystallization from benzene.

EXAMPLE 3

*Preparation of d-lysergic acid N-methyl N-isopropyl amide*

A solution of 0.02 mol of the mixed anhydride of *d*-lysergic acid and trifluoroacetic acid in 225 ml. of acetonitrile is prepared according to the procedure of Example 2. This solution is added to 0.104 mol of methyl isopropyl amine dissolved in 200 ml. of acetonitrile, and the mixture is allowed to stand in the dark for about one hour and then is evaporated to dryness. The residue is taken up in about 400 ml. of chloroform and the solution is washed with ten successive 50 ml. portions of water. The washed chloroform solution is dried with anhydrous magnesium sulfate and is evaporated to dryness. The residue comprises a mixture of both the "normal" and "iso" *d*-lysergic acid N-methyl N-isopropyl amides. A solution of 3.5 g. of the amide mixture in about 100 ml. of a 1:9 chloroform-benzene solvent mixture is placed on a chromatographic adsorption column containing about 110 g. of basic alumina. The first liter of eluate, using the same solvent mixture, after evaporation of the eluting solvent and recrystallization of the resulting residue from ethyl acetate, yields about 340 mg. of *d*-lysergic acid N-methyl-N-isopropyl amide, melting at about 196–197° C. with decomposition. The chromatogram is further developed with another one liter portion of the same eluent followed by 100 ml. of pure chloroform, and these eluates comprise mixtures of the "normal" and "iso" amides. Further elution with 200 ml. of pure chloroform results in an eluate which yields a solid residue of *d*-isolysergic acid N-methyl N-isopropyl amide after evaporation of the eluting solvent. Recrystallization of this residue from ethyl acetate yields about 860 mg. of *d*-isolysergic acid N-methyl N-isopropyl amide melting at about 194–195° C. with decomposition.

*Analysis.*—Calculated for $C_{20}H_{25}N_3O$: C, 74.25; H, 7.79; N, 12.99. Found: C, 73.85; H, 7.86; N, 12.78.

*d*-Lysergic acid N-methyl N-n-propyl amide is prepared as set forth above using methyl n-propyl amine in place of methyl isopropyl amine. It is purified in the form of its acid tartrate salt as set forth in Example 9. *d*-Lysergic acid N-methyl N-n-propyl amide acid tartrate melts at about 160° C. with decomposition.

*d*-Isolysergic acid N-methyl N-n-propyl amide is also purified by chromatography. It melts at about 180–181° C. with decomposition.

*Analysis.*—Calculated for $C_{20}H_{25}N_3O$: C, 74.25; H, 7.79; N, 12.99. Found: C, 74.24; H, 8.00; N, 12.76.

EXAMPLE 4

*Preparation of d-lysergic acid 4-methylpiperazide*

A mixture of 0.02 mol of *d*-lysergic acid, 0.02 mol of magnesium oxide and 150 ml. of acetonitrile is cooled to about −20° C. A solution of trifluoroacetic anhydride in 100 ml. of acetonitrile is cooled to about −20° C. and added slowly to the cold mixture containing *d*-lysergic acid. The reaction mixture is kept at about −20° C. in the dark for about one and three-fourths hours. It is then added to a solution of 0.084 mol of N-methylpiperazine in 150 ml. of acetonitrile maintained at room temperature. After standing for one and one-half hours at room temperature, the solvent is removed from the reaction mixture in vacuo. The maroon-colored solid residue, comprising a mixture of *d*-isolysergic acid 4-methylpiperazide and *d*-lysergic acid 4-methylpiperazide, is shaken with 40 ml. of water and then extracted with four 100 ml. portions of chloroform. The combined chloroform extracts are washed eight times with successive 50 ml. portions of water. The washed chloroform extract is then dried over anhydrous magnesium sulfate and is evaporated to dryness, leaving as a dark, sticky residue, a mixture comprising *d*-lysergic acid 4-methylpiperazide and *d*-isolysergic acid 4-methylpiperazide. The residue is dissolved in 20 ml. of warm ethyl acetate, seeded if desired with some previously obtained *d*-isolysergic acid 4-methylpiperazide, and allowed to stand in the dark for three days at room temperature. A crystalline precipitate of *d*-isolysergic acid 4-methylpiperazide forms, which is removed by filtration, and is washed with a small amount of cold ethyl acetate. *d*-Isolysergic acid 4-methylpiperazide thus obtained melts at about 193–195° C. with decomposition.

The filtrate from the crystallization of *d*-isolysergic acid 4-methylpiperazide is evaporated to dryness in vacuo and the *d*-lysergic acid 4-methylpiperazide contained in the residue is purified by chromatography over a column of basic alumina. The substance is placed on the chromatographic column in 1:6 chloroform-benzene, and the column is eluted with 1:3 chloroform-benzene. A substantially white powder consisting of *d*-lysergic acid 4-methylpiperazide is obtained from the eluate by evaporation of the eluting solvent. Paper strip chromatography shows this material to be homogeneous.

EXAMPLE 5

*Preparation of d-lysergic acid N-sec-butyl amide*

The procedure of Example 2 is followed, with the exception that 0.001 mol of the mixed anhydride of lysergic acid and trifluoroacetic acid are treated with 0.006 mol of sec-butyl amine. A residue comprising *d*-lysergic acid N-sec-butyl amide and *d*-isolysergic acid N-sec-butyl amide results after evaporation of the chloroform extract to dryness. The maleate salt of *d*-lysergic acid N-sec-butyl amide is prepared by dissolving the residue in methanol, adding maleic acid and then ether. Fine needles of crystalline *d*-lysergic acid N-sec-butyl amide acid maleate precipitate immediately. About 30 mg. of crystalline *d*-lysergic acid N-sec-butyl amide acid maleate having a decomposition point of about 216° C. are obtained.

*Analysis.*—Calculated for $C_{24}H_{29}N_3O_5$: C, 65.43; H, 6.65; N, 9.56. Found: C, 65.29; H, 6.71; N, 9.53.

The mother liquors from the isolation of the *d*-lysergic acid N-sec-butyl amide acid maleate are evaporated to dryness and the *d*-isolysergic acid N-sec-butyl amide acid maleate therein is converted to the corresponding free base by the method disclosed in Example 1. The free base is chromatographed over basic alumina using a 4:1 benzene-chloroform mixture for elution. *d*-Isolysergic acid N-sec-butyl amide is eluted and the residue remaining after evaporation of the solvent from the eluate, is crystallized from benzene yielding *d*-isolysergic acid N-sec-butyl amide, melting with decomposition at about 190–191° C.

EXAMPLE 6

*Preparation of d-lysergic acid morpholide*

Following the procedure of Example 2, one millimol of the mixed anhydride of *d*-lysergic acid and trifluoroacetic acid is prepared in 17 ml. of acetonitrile and is added to 5 millimols of morpholine in 6 ml. of acetonitrile. *d*-Lysergic acid morpholide thus formed is isolated by the procedure of the same example. *d*-Lysergic acid morpholide is further purified by preparation of its maleate salt in a manner analogous to that set forth in Example 2. Paper strip chromatography shows the compound to be homogeneous.

EXAMPLE 7

*Preparation of d-lysergic acid N-isopropyl amide*

Following the procedure of Example 2, one millimol of the mixed anhydride of *d*-lysergic acid and trifluoroacetic acid is prepared and 5.7 millimols of isopropyl amine in 6 ml. of acetonitrile are added thereto. The d-lysergic acid N-isopropyl amide which is formed is isolated according to the same procedure. One hundred forty milligrams of d-lysergic acid are recovered from the mother liquors obtained during this purification procedure. d-Lysergic acid N-isopropyl amide is further purified by the preparation of d-lysergic acid N-isopropyl amide acid maleate.

EXAMPLE 8

*Preparation of d-lysergic acid piperidide*

Following the procedure of Example 2, two millimols of the mixed anhydride of d-lysergic acid and trifluoroacetic acid are prepared, and 10.8 millimols of piperidine dissolved in 15 ml. of acetonitrile are added thereto. A product consisting of 200 mg. of lysergic acid piperidide is obtained, while 170 mg. of d-lysergic acid are recovered from the mother liquors.

Another preparation of d-lysergic acid piperidide is made following the procedure of Example 2, but using about ten-fold quantities of materials. Thus 5.5 g. of a mixture of d-lysergic acid piperidide and d-isolysergic acid piperidide are obtained after evaporation of the chloroform used for extraction. This mixture is dissolved in 100 ml. of a 4:1 benzene-chloroform solvent mixture and the solution is placed on column consisting of 200 g. of basic alumina in a 25 mm. glass tube. The chromatogram is developed with four liters of a 3:1 benzene-chloroform mixture. Further elution with the same solvent mixture results in a collection of fractions of various volumes. This information is included in the following Table I, as well as a summary of the results obtained by evaporating each eluate fraction to dryness, dissolving the resulting residue in methanol, and adding maleic acid thereto in order to form the acid maleate salt thereof.

TABLE I

| Fraction No. | Vol. of Eluting Solvent, ml. | Result |
| --- | --- | --- |
| 1 | 250 | Acid maleate salt, M.P.=190–192° C. |
| 2 | 150 | Crystalline acid maleate salt. |
| 3 | 100 | Do. |
| 4 | 100 | Acid maleate salt, M.P.=191–193° C. |
| 5 | 100 | Acid maleate salt, M.P.=192–194° C. |
| 6–13 | 900 | No crystalline maleate salt obtained. |

Fractions 1–5 contain d-lysergic acid piperidide which on treatment with maleic acid forms crystalline d-lysergic acid piperidide acid maleate. The corresponding d-isolysergic acid piperidide is partially eluted in fractions 6–13 but does not crystallize either as the free base or as an acid maleate salt.

The acid maleate salts from fractions 1–5 above are combined and recrystallized. Purified d-lysergic acid piperidide acid maleate thus obtained is converted to the corresponding free base by the procedure set forth in Example 1 and the free base in chloroform solution is washed with several 100 ml. portions of water. The chloroform layer is dehydrated and the chloroform is removed by evaporation in vacuo. The residue comprising d-lysergic acid piperidide, is dissolved in methanol and converted to the acid maleate salt as hereinbefore described. d-Lysergic acid piperidide acid maleate melts at about 204–206° C. with decomposition.

*Analysis.*—Calculated for $C_{25}H_{29}N_3O_5$, C, 66.50; H, 6.47; N, 9.31. Found: C, 66.50; H, 6.74; N, 9.24.

EXAMPLE 9

*Preparation of d-lysergic acid N,N-diisopropyl amide*

Following the procedure of Example 2, two millimols of the mixed anhydride of d-lysergic and trifluoroacetic acids are prepared and 10.8 millimols of diisopropyl amine are added thereto. The reaction is carried out and the d-lysergic acid N,N-diisopropyl amide is isolated following the procedure of Example 3. Four hundred milligrams of crystalline d-lysergic acid N,N-diisopropyl amide, melting at about 245° C., are obtained.

A second preparation of d-lysergic acid N,N-diisopropyl amide is similarly carried out as hereinabove set forth, but with the scale increased tenfold. 1.5 g. of lysergic acid is recovered from the water washings. The residue remaining after evaporation of the combined chloroform extracts weighs about 9.6 g. and contains about 50 percent of mixed lysergic acid N,N-diisopropyl amides. The residue is chromatographed over 250 g. of basic alumina according to the procedure of Example 3, using a 1:6 chloroform-benzene mixture as the initial eluant. The chloroform content of the eluant is gradually increased. After 3200 ml. of such eluates are collected and discarded, the eluant is changed to 1:1 chloroform-benzene. Passage of 800 ml. of this solvent mixture elutes d-lysergic acid N,N-diisopropyl amide in five fractions, which after evaporation of the eluting solvent give a combined weight of about 390 mg. of solid amide. The solid residue is dissolved in methanol and tartaric acid added thereto, thus forming d-lysergic acid N,N-diisopropyl amide acid tartrate which decomposes at about 206–208° C. The acid tartrate salt is converted to the corresponding free base by the method of Example 1 and the free base is in turn converted into the acid maleate by the method of Example 2. Five hundred milligrams of feathery needle-like crystals of d-lysergic acid N,N-diisopropyl amide acid maleate are thus obtained, melting at about 150–165° C. The specific rotation of the salt is as follows: $[\alpha]_D^{26} = +47.4°$ (c.=.35 in 95 percent alcohol). Paper strip chromatography shows the compound to be homogeneous.

EXAMPLE 10

*Preparation of d-lysergic acid N-methyl N-isopropyl amide*

Following the procedure of Example 2, two millimols of the mixed anhydride of d-lysergic acid and trifluoroacetic acid are prepared and 10.8 millimols of methyl isopropyl amine are added thereto. The reaction is carried out and d-lysergic acid N-methyl N-isopropyl amide is isolated by the method of Example 3. Two hundred milligrams of d-lysergic acid N-methyl N-isopropyl amide melting at about 196–197° C. are obtained.

EXAMPLE 11

*Preparation of d-lysergic acid pyrrolidide*

The procedure of Example 2 is repeated, except that 0.02 mol of the mixed anhydride of d-lysergic acid and trifluoroacetic acid are prepared in 200 ml. of acetonitrile at —20° C. and are added to 0.108 mol of pyrrolidine dissolved in 150 ml. of acetonitrile. Upon evaporation of the solvent from the chlorform extracts, an amorphous residue remains which is dried at 60° C. at a pressure of 0.1 mm. of mercury for one hour. This residue comprises lysergic acid pyrrolidide and is a dark brown, amorphous, fluffy solid weighing about 3.3 g. The solid is chromatographed over 150 g. of basic alumina using a 2:1 benzene-chloroform solvent mixture as the eluant. Development with a total of 850 ml. of this solvent mixture, and receiving eleven separate fractions of about 80 ml. each, results in elution of the d-lysergic acid pyrrolidide formed in the reaction. Each fraction is separately evaporated to dryness in vacuo and is converted to the corresponding acid maleate following the procedure of Example 2. d-Lysergic acid pyrrolidide acid maleate thus obtained melts at about 199–201° C. d-Isolysergic acid pyrrolidide is eluted by more polar solvent mixtures. Thus, upon evaporation of the eluate obtained with chloroform or the like, d-isolysergic acid pyrrolidide is obtained.

EXAMPLE 12

*Preparation of l-valinol amide of d-lysergic acid*

Five hundred thirty milligrams of *d*-lysergic acid are dissolved in 12 ml. of acetonitrile and are mixed with 880 mg. of trifluoroacetic acid anhydride dissolved in 10 ml. of acetonitrile. The temperature of the reaction mixture is maintained at about −18° C. for one and three-fourths hours while the mixed anhydride of *d*-lysergic acid and trifluoroacetic acid is being formed. The solution of the mixed anhydride is then added to 1.05 g. of *l*-valinol (1-hydroxy-3-methylbutyl-2-amine) dissolved in 25 ml. of acetonitrile held at ambient temperature. The reaction mixture is allowed to stand in the dark for one and one-fourth hours during which time lysergic acid *l*-valinol amide is formed. The solvent is removed in vacuo and the resulting residue, comprising lysergic acid *l*-valinol amide, is dissolved in 200 ml. of chloroform. The chloroform solution is washed three times with water, is dried and the chloroform is then removed in vacuo. The organic residue is dissolved in 5 ml. of anhydrous ethanol and 1 ml. of 4 N potassium hydroxide mixed with 5 ml. of a 1:1 water-ethanol solution is added thereto. This mixture is allowed to stand for two hours in the dark during which time any amino ester of lysergic acid formed as a by-product during the reaction is rearranged to the hydroxy amide. The rearrangement is carried out under nitrogen. An excess of solid carbon dioxide is then added and the resulting mixture is evaporated to near dryness in vacuo. The residue comprising the *l*-valinol amides of lysergic acid is then dissolved in 200 ml. of chloroform and the chloroform solution is washed with water in the same way as described above. The chloroform solution is dried over anhydrous sodium sulfate and is evaporated to near dryness in vacuo, whereupon crystals of the *l*-valinol amide of *d*-lysergic acid form. After filtering, 170 mg. of crystalline *l*-valinol amide of *d*-lysergic acid are obtained.

A preparation on a threefold larger scale is similarly carried out. Following the rearrangement procedure the lysergic acid *l*-valinol amide obtained after evaporation of the combined chloroform extract to dryness is dissolved in methanol and maleic acid acid is added thereto, thus forming *d*-lysergic acid *l*-valinol amide acid maleate (*d*-lysergic acid N-1-hydroxy-3-methylbutyl-2 amide acid maleate). Two hundred ten milligrams of this salt are obtained, decomposing at about 213–215° C.

*Analysis.*—Calculated for $C_{25}H_{31}N_3O_6$: C, 63.95; H, 6.66; N, 8.95. Found: C, 63.91; H, 6.76; N, 8.86.

The filtrate from the isolation of the "normal" amide acid maleate salt contains *d*-isolysergic acid *l*-valinol amide acid maleate which is converted to the corresponding free base by the method of Example 1. The free base is crystallized from ethyl acetate to yield about 300 mg. of *d*-isolysergic acid *l*-valinol amide melting at about 174–175° C. with decomposition.

EXAMPLE 13

*Preparation of l-isovalinol amide of d-lysergic acid*

A solution of 2.12 g. of *d*-lysergic acid in 40 ml. of acetonitrile is treated with 3.52 g. of trifluoroacetic acid anhydride dissolved in 30 ml. of acetonitrile, according to the method of Example 2, to form the mixed anhydride of *d*-lysergic acid and trifluoroacetic acid. The mixed anhydride is added to a solution of 4.15 g. of *l*-isovalinol (1-hydroxy-2-methylbutyl-2-amine) dissolved in 115 ml. of acetonitrile. The reaction mixture is allowed to stand at room temperature in the dark for two hours. The solvent is then removed in vacuo and the resulting residue is dissolved in 10 ml. of absolute ethanol containing 1 ml. of 4 N potassium hydroxide. After two hours, the mixture is treated and the crude product isolated as in Example 12. The crude product, comprising a mixture of the *l*-isovalinol amides of d-lysergic acid and *d*-isolysergic acid, is purified by chromatography over basic alumina using a 2:1 chloroform-benzene eluant. After 290 ml. of this mixture has been passed through the chromatographic column and discarded, a succeeding 200 ml. eluate is collected. This eluate is evaporated to dryness, and the resulting residue is crystallized from ethyl acetate. Three hundred fifteen milligrams of the *l*-isovalinol amide of *d*-isolysergic acid are obtained, melting at about 180–182° C. with decomposition.

*Analysis.*—Calculated for $C_{21}H_{27}N_3O_2$: C, 71.36; H, 7.70; N, 11.89. Found: C, 71.29; H, 7.91; N, 11.64.

Three hundred fifty milliliters of an eluant containing chloroform and benzene in a 2:1 ratio and 50 ml. of an eluant consisting of one percent methanol in chloroform are passed through the column and discarded. However, 110 ml. of a one percent methanol solution in chloroform elutes the corresponding *d*-lysergic acid amide which is isolated by evaporation of the eluting solvent. The residue is taken up in acetone and treated with maleic acid to form *d*-lysergic acid *l*-isovalinol amide acid maleate (*d*-lysergic acid N-1-hydroxy-2-methylbutyl-2 amide acid maleate) which crystallizes from acetone. The *d*-lysergic acid *l*-isovalinol amide acid maleate melts at about 183–185° C. with decomposition.

EXAMPLE 14

*Preparation of d-lysergic acid N-β-methoxyethyl amide*

The procedure of Example 2 is repeated, using β-methoxy-ethyl amine as the amine reactant. *d*-Lysergic acid N-β-methoxy-ethyl amide acid maleate prepared by the method of Example 2 is obtained in amorphous form. The acid maleate salt is therefore converted to the free base as in Example 1 and the free base is dissolved in 450 ml. of a 4:1 benzene-chloroform mixture and is chromatographed over 60 g. of basic alumina. About 1200 ml. of the same solvent mixture is then passed through the column and collected. The solvent is evaporated and the residue crystallized from dry acetone to give 340 mg. of pure crystalline *d*-lysergic acid N-β-methoxyethyl amide, melting at about 182–183° C. with decomposition. The eluting solvent is then changed to chloroform and the next 250 ml. of eluate are collected and evaporated to dryness. The residue remaining is crystallized from acetone to give an additional 180 mg. of pure amide.

EXAMPLE 15

*Preparation of d-lysergic acid N-γ-methoxypropyl amide*

The procedure of Example 2 is followed except that N-γ-methoxypropyl amine is used as the amine reactant. The reaction mixture is purified chromatographically according to the method of Example 3. The crude product is dissolved in 700 ml. of 9:1 benzene-chloroform and is chromatographed over a column containing 65 g. of basic alumina. Further development is obtained by eluting with 400 ml. of 3:1 benzene-chloroform, the eluates at this point being discarded. Continued development of the chromatogram employing 900 ml. more of the same eluant, collected in three fractions of 300 ml. each, yields pure *d*-lysergic acid N-γ-methoxypropyl amide, after evaporation of the eluting solvents. The *d*-lysergic acid N-γ-methoxypropyl amide obtained is dissolved in acetone and is converted to the corresponding acid maleate salt by the addition of maleic acid. A total amount of 450 mg. of pure, needle-like crystals of *d*-lysergic acid N-γ-methoxy-propyl amide acid maleate are obtained, melting at about 200–201° C. with decomposition.

*Analysis.*—Calculated for $C_{24}H_{29}N_3O_6$: C, 63.14; H, 6.42; N, 9.23. Found: C, 63.43; H, 6.44; N, 8.98.

EXAMPLE 16

*Preparation of d-lysergic acid p-methoxyanilide*

The procedure of Example 2 is repeated, except that p-methoxy aniline is employed as the amine reactant. The reaction mixture is purified by the method of Example 3, and a crude mixture of "normal" and "iso" d-lysergic acid amides is obtained. This mixture of amides is dissolved in 100 ml. of a 9:1 benzene-chloroform mixture, and is placed on a column of 75 g. of basic alumina. The chromatogram is developed with 600 ml. of a 3:1 benzene-chloroform mixture followed by 400 ml. of a 3:2 benzene chloroform mixture, these eluates being discarded. The eluant is then changed to a 1:1 mixture of benzene and chloroform and 500 ml. of the resulting eluate are collected. Upon evaporation of this eluate, a solid residue comprising purified d-lysergic acid p-methoxyanilide is obtained. The residue is dissolved in a small amount of methanol and about 0.15 g. of maleic acid is added. An immediate crystalline precipitate of the acid maleate salt of d-lysergic acid p-methoxyanilide forms. The precipitate is filtered and washed with anhydrous methanol. About 100 mg. of fine, needle-like crystals are obtained, melting at about 208–210° C. with decomposition.

*Analysis.*—Calculated for $C_{27}H_{27}N_3O_6$: C, 66.24; H, 5.56; N, 8.59. Found: C, 66.13; H, 5.56; N, 8.60.

EXAMPLE 17

*Preparation of d-lysergic acid p-methylanilide*

The procedure of Example 3 is followed except that the mixed anhydride is prepared from 7.2 millimols of d-lysergic acid and 15.1 millimols of trifluoroacetic acid. To the solution of the mixed anhydride is added a solution of 37.5 millimols of p-toluidine in 100 ml. of acetonitrile. A mixture of "normal" and "iso" d-lysergic acid p-methylanilides is obtained as a residue after purification is carried out by the procedure of Example 3. These amides are dissolved in 50 ml. of a 9:1 mixture of benzene and chloroform, and are chromatographed over a column of basic alumina. Elution of the column with 800 ml. of the same solvent mixture yields pure d-isolysergic acid p-methylanilide after evaporation of the solvent. Crystallization of this amide from a minimum amount of acetone gives crystals melting at about 222–223° C. with decomposition.

The chromatographic column is then eluted with 400 ml. of 3:1 benzene-chloroform and the eluate is discarded. The column is next eluted with 200 ml. of 3:2 benzene-chloroform, followed by 200 ml. of 1:1 benzene-chloroform. These eluates contain d-lysergic acid p-methylanilide. Evaporation of the solvent from these combined eluates yields a residue of pure d-lysergic acid p-methylanilide, which is dissolved in the minimum amount of acetone and converted to the corresponding acid maleate by the addition of maleic acid. A crystalline precipitate of pure d-lysergic acid p-methylanilide acid maleate is formed, weighing about 160 mg. The salt decomposes at 225° C.

*Analysis.*—Calculated for $C_{27}H_{27}N_3O_5$: C, 68.48; H, 5.75; N, 8.88. Found: C, 68.54; H, 5.67; N, 9.03.

EXAMPLE 18

*Preparation of d-lysergic acid N-cyclohexyl amide*

The procedure of Example 2 is followed, except that cyclohexyl amine is employed as the amine reactant. The d-lysergic acid N-cyclohexyl amide acid maleate thus obtained weighs about 0.6 g. and melts at about 235° C. with decomposition.

*Analysis.*—Calculated for $C_{20}H_{31}N_3O_5$: C, 67.08; H, 6.71; N, 9.03. Found: C, 66.63; H, 6.98; N, 8.93.

EXAMPLE 19

*Preparation of d-lysergic acid m-methoxyanilide*

Preparation of d-lysergic acid m-methoxyanilide is carried out according to the procedure of Example 2, except that m-anisidine is used as the amine reactant. The purified lysergic acid m-methoxyanilides obtained as a residue after evaporation of the chloroform solution are dissolved in about 50 ml. of 9:1 benzene-chloroform, which is then poured over a column of about 65 g. of alumina. Elution with 1100 ml. of 9:1 benzene-chloroform gives no solid product after evaporation. Continued elution with 200 ml. of 2:3 benzene-chloroform followed by 200 ml. of lower ratio benzene-chloroform solvent mixtures gives residues comprising pure d-lysergic acid m-methoxyanilide upon separate evaporation of the eluates. The combined residues are dissolved in the minimum amount of acetone and upon addition of maleic acid, there is formed d-lysergic acid m-methoxyanilide acid maleate which crystallizes on standing. The precipitate is removed by filtration and washed with cold acetone to give 160 mg. of d-lysergic acid m-methoxyanilide acid maleate salt melting at about 209–210° C. with decomposition.

*Analysis.*—Calculated for $C_{27}H_{27}N_3O_6$: C, 66.24; H, 5.56; N, 8.59. Found: C, 66.41; H, 5.79; N, 8.39.

EXAMPLE 20

*Preparation of d-lysergic acid o-methoxyanilide*

The process of Example 19 was repeated except that o-anisidine was employed in place of m-anisidine. Chromatography of the purified mixture of lysergic acid o-methoxyanilides is begun in the same fashion as in Example 19. However, after initial elution with 500 ml. of a 9:1 benzene-chloroform mixture, the column is eluted with 500 ml. of 4:1 benzene-chloroform. This eluate is evaporated to dryness and the resulting residue is crystallized from acetone. There are thus obtained 360 mg. of d-isolysergic acid o-methoxyanilide melting at about 246–247° C. with decomposition. The chromatographic column is then eluted with 1300 ml. more of the same solvent mixture. Evaporation of this eluate to dryness and crystallization of the resulting residue from benzene yields 440 mg. of pure d-lysergic acid o-methoxyanilide melting at about 180–185° C. with decomposition.

*Analysis.*—Calculated for $C_{23}H_{23}N_3O_2$: C, 73.97; H, 6.21; N, 11.25. Found: C, 73.82; H, 6.41; N, 11.22.

EXAMPLE 21

*Preparation of d-lysergic acid p-chloroanilide*

The procedure of Example 2 is repeated, except that p-chloroaniline is used as the amine reactant. The mixture of "normal" and "iso" d-lysergic acid p-chloroanilides is separated chromatographically using a column of basic alumina. The mixture of amides is dissolved in 400 ml. of a 17:3 benzene-chloroform mixture and placed on the column. The resulting eluate gives no crystalline material upon evaporation to dryness. Examination of the column under ultraviolet light shows two bands of blue fluorescence, and elution is continued with the same solvent mixture. The next 200 ml. of eluate removes the lowest fluorescent band and yields a solid residue on evaporation to dryness in vacuo. After crystallization of this residue from the minimum amount of benzene, there is obtained 150 mg. of d-isolysergic acid p-chloroanilide melting at about 206° C. with decomposition. Elution is continued with the same solvent mixture until the last fluorescent band has approached the bottom of the column, the intervening eluates being discarded. The column is then eluted with 100 ml. of 1:3 benzene-chloroform eluate followed by 200 ml. of pure chloroform. A solid residue remains after evaporation of the solvents from the combined eluates. The residue is dissolved in the minimum amount of acetone and treated with excess maleic acid. An immediate precipitate of fine, needle-like crystals of d-lysergic acid p-chloroanilide acid maleate is formed. The crystals are filtered, are washed with cold acetone and dried. About 260 mg. of the salt, melting at about 206° C. with decomposition, are obtained.

*Analysis.*—Calculated for $C_{26}H_{24}N_3O_5Cl$: C, 63.22; H, 4.90; N, 8.51. Found: C, 63.23; H, 5.05; N, 8.39.

EXAMPLE 22

*Preparation of d-lysergic acid N-1,1-dimethylethanol amide*

Following the method of Example 12, 0.02 mol of the mixed anhydride of *d*-lysergic acid and trifluoroacetic acid is prepared and 0.104 mol of 2-amino-2-methylpropan-1-ol is used in place of *l*-valinol as the amine reactant. Evaporation of the chloroform extract obtained after carrying out the purification and alkaline rearrangement procedures of that example yields 2.8 g. of a fluffy, light brown solid. Paper strip chromatography of this solid using benzene as a developing solvent shows it to be a mixture of the "normal" and "iso" *d*-lysergic acid N-1,1-dimethylethanol amides. The mixture is separated chromatographically over a column of basic alumina, using a 2:1 chloroform-benzene mixture for development and following the separation of the amide bands on the column with ultraviolet light. The first 235 ml. of eluate yields no solid material on evaporation to dryness. The next 210 ml. fraction of eluate contains fluorescent material and is collected; and the column is further eluted with 320 ml. of chloroform which is collected. These two eluates are combined and evaporated to dryness. A total amount of 1300 mg. of amorphous *d*-isolysergic acid N-1,1-dimethylethanol amide is thus obtained. Paper strip chromatography using a benzene-formamide system this material to be homogeneous. A further quantity of 400 ml. of chloroform containing an added 1.5 percent of methanol is poured over the column. On evaporation of the resulting eluate a residue of *d*-lysergic acid N-1,1-dimethylethanol amide remains. The residue is crystallized from acetone and 360 mg. of crystalline *d*-lysergic acid N-1,1-dimethylethanol amide, melting at about 118–128° C., are obtained. Paper strip chromatography shows this material to be homogeneous. This material is then converted to the acid maleate salt by procedures described heretofore. *d*-Lysergic acid N-1,1-dimethylethanol amide acid maleate melts at about 193–195° C. with decomposition.

*Analysis.*—Calculated for $C_{24}H_{29}N_3O_6$: C, 63.28; H, 6.42; N, 9.23. Found: C, 63.24; H, 6.43; N, 9.35.

EXAMPLE 23

*Preparation of d-lysergic acid N-2,2-dimethylethanol amide*

The procedure of Example 12 is followed except that 0.02 mol of the mixed anhydride of lysergic acid and trifluoroacetic acid and 0.104 mol of 2-methyl-2-hydroxy-1-aminopropane are used. Chromatographic separation of the purified and rearranged product which comprises a mixture of both the "normal" and "iso" *d*-lysergic acid N-2,2-dimethylethanol amides is carried out as follows: 420 mg. of the purified amide mixture is dissolved in 20 ml. of 1:1 benzene-chloroform mixture and placed on a column containing 20 g. of basic alumina. The chromatographic column is developed with 250 ml. of the same solvent mixture followed by 40 ml. of a 2:1 benzene-chloroform solvent mixture. These eluates give no solid product upon evaporation of the solvents. The column is further eluted with 130 ml. of pure chloroform, and a solid residue is obtained upon evaporation of the chloroform. This residue is crystallized from ethyl acetate, whereupon 70 mg. of pure *d*-isolysergic acid N-2,2-dimethylethanol amide melting at about 176–177° C. are recovered. Further development of the chromatogram with 100 ml. chloroform containing two percent methanol gives no residue upon evaporation, but continued elution with 75 ml. of chloroform containing four percent methanol does give a solid residue after evaporation. The residue is crystallized from acetone, and there is obtained crystalline *d*-lysergic acid N-2,2-dimethylethanol amide melting at about 86–93° C. The amide is dissolved in the minimum amount of acetone and an excess of maleic acid is added. An immediate crystalline precipitate of *d*-lysergic acid N-2,2-dimethylethanol amide acid maleate is formed. The crystalline maleic acid addition salt decomposes at about 210° C.

*Analysis.*—Calculated for $C_{24}H_{29}N_3O_6$: C, 63.28; H, 6.42; N, 9.23. Found: C, 63.39; H, 6.56; N, 9.51.

EXAMPLE 24

*Preparation of d-lysergic acid 2,6-lupetidide*

Two millimols of the mixed anhydride of *d*-lysergic acid and trifluoroacetic acid in 40 ml. of acetonitrile are prepared in accordance with the method of Example 1 in which 2 millimols of anhydrous magnesium oxide are present during the reaction. The solution containing the mixed anhydride is added to a solution of 10 millimols of 2,6-lupetidine in 35 ml. of acetonitrile. The remainder of the process is carried out in accordance with the procedure of Example 2. Three hundred ten milligrams of a light brown solid are obtained comprising a mixture of *d*-lysergic acid 2,6-lupetidide and *d*-isolysergic acid 2,6-lupetidide.

A second preparation carried out as above on a scale ten times larger, yields a similar mixture of the "normal" and "iso" 2,6-lupetidides which are then purified by chromatography following the procedure of Example 3. Development with 2.5 liters of a five percent solution of chloroform in benzene and of 3 liters of a 7.5 percent solution of chloroform in benzene, results in the elution of only traces of material. *d*-Lysergic acid 2,6-lupetidide is then eluted with about 3 liters of a 7.5 percent solution of chloroform in benzene, and is recovered as a non-crystalline but homogeneous substance by evaporation of the solvent.

Subsequent elution with about one liter of a 1:1 benzene-chloroform mixture serves to remove *d*-isolysergic acid 2,6-lupetidide, which is recovered by evaporation of the eluting solvent. Crystallization from a mixture of methanol and ethyl acetate yields *d*-isolysergic acid 2,6-lupetidide melting at about 204–206° C. with decomposition.

*Analysis.*—Calculated for $C_{23}H_{29}N_3O$: C, 76.00; H, 8.04; N, 11.56. Found, C, 76.12; H, 8.00; N, 11.56.

EXAMPLE 25

*Preparation of d-lysergic acid 2,5-dimethylpyrrolidide*

Two millimols of the mixed anhydride of *d*-lysergic acid and trifluoroacetic acid in 40 ml. of acetonitrile are prepared in accordance with the procedure of Example 1, except that two milliequivalents of potassium carbonate are present in suspension during the formation of the mixed anhydride. The reaction mixture is added to a solution of 8.4 millimols of 2,5-dimethylpyrrolidine in 25 ml. of acetonitrile. The reaction between the mixed anhydride and 2,5-dimethylpyrrolidine is carried out and the lysergic acid 2,5-dimethyl pyrrolidines are isolated in purified form according to the method of Example 2. Two hundred sixty milligrams of a light tan product comprising a mixture of *d*-lysergic acid 2,5-dimethyl-pyrrolidide and *d*-isolysergic acid 2,5-dimethylpyrrolidide are thus obtained.

The amide mixture is dissolved in about 20 ml. of 7:1 benzene-chloroform, and chromatographed on 10 g. of basic alumina. Development of the chromatogram with the same solvent mixture, collection of the resulting eluate, and evaporation of the eluting solvent leaves an amorphous residue consisting of *d*-lysergic acid 2,5-dimethylpyrrolidide. The column is then eluted with chloroform. Evaporation of the solvent from the resulting eluate leaves a residue consisting of *d*-isolysergic acid 2,5-dimethylpyrrolidide, which upon crystallization from ethyl acetate melts with decomposition at about 192–194° C.

EXAMPLE 26

*Preparation of d-lysergic acid D-2-pipecolide*

Two millimols of mixed anhydride of *d*-lysergic acid and trifluoroacetic acid are prepared in accordance with the procedure set forth in Example 1. The mixed anhydride is added to 840 mg. of D-2-pipecoline. The remainder of the process is carried out by the procedure of Example 2. A mixture of $d$-lysergic acid D-2- pipecolide and $d$-isolysergic acid D-2-pipecolide is obtained. The mixture is dissolved in 9:1 benzene-chloroform and chromatographed on basic alumina. Development with the same solvent, collection of the resulting eluate and evaporation of the eluting solvent leaves an amorphous residue consisting of $d$-lysergic acid D-pipecolide. Subsequent passage of pure chloroform over the column gives an eluate which yields pure $d$-isolysergic acid D-pipecolide, after evaporation of the eluting solvent and crystallization of the resulting residue from acetone. $d$-isolysergic acid D-pipecolide crystallizes in heavy prisms and melts with decomposition at about 205–207° C.

*Analysis.*—Calculated for $C_{22}H_{27}N_3O$: C, 75.61; H, 7.79; N, 12.03. Found: C, 75.65; H, 7.96; N, 11.83.

EXAMPLE 27

*Preparation of d-lysergic acid N-t-butyl amide*

A solution of 2 millimols of the mixed anhydride of $d$-lysergic acid and trifluoroacetic acid in 40 ml. of acetonitrile is prepared and added to a solution of 10.4 millimols of t-butyl amine in 50 ml. of acetonitrile. The reaction is carried out and the reaction product isolated according to the procedure of Example 2. In this manner 350 mg. of purified $d$-lysergic acid N-t-butyl amide are obtained. The amide is dissolved in the minimum amount of methanol and is converted to $d$-lysergic acid N-t-butyl amide acid maleate by the addition of an excess of maleic acid. Anhydrous ether is added to this mixture until fine needles begin to precipitate. The solution is kept in the dark at room temperature for one hour and the crystals of $d$-lysergic acid N-t-butyl amide acid maleate are then filtered off, are washed with a solvent mixture containing one part methanol to ten parts diethyl ether, and dried. The crystalline $d$-lysergic acid N-t-butyl amide acid maleate thus obtained decomposes at about 212° C.

*Analysis.*—Calculated for $C_{24}H_{29}N_3O_5$: C, 65.57; H, 6.65; N, 9.56. Found: C, 65.70; H, 6.75; N, 9.30.

The mother liquor from crystallization is evaporated to dryness whereupon the maleate salt of $d$-isolysergic acid N-t-butyl amide is obtained. The salt is converted to the free base of $d$-lysergic acid N-t-butyl amide by the procedure outlined in Example 1. The free base is purified chromatographically in accordance with the procedure of Example 3. After crystallization from ethyl acetate, 85 mg. of $d$-isolysergic acid N-t-butyl amide are obtained, melting with decomposition above about 245° C.

EXAMPLE 28

*Preparation of d-lysergic acid N-neopentyl amide*

The procedure of Example 2 is repeated, using a solution of 2.0 millimols of the mixed anhydride of $d$-lysergic acid and trifluoroacetic acid in 40 ml. of acetonitrile which is added at room temperature to a solution containing 10.4 millimols of neopentyl amine in 60 ml. of acetonitrile. The crude neopentyl amide of lysergic acid is obtained as a dark brown oil. This oil is dissolved in 2 ml. of acetone and maleic acid is added to the solution. There is an immediate precipitation of white crystals of $d$-lysergic acid N-neopentyl amide acid maleate. An equal amount of ether is added and the mixture is cooled to 0° C. The crystals are filtered, are washed with cold acetone, and are dried in air. Seventy milligrams of crystalline $d$-lysergic acid N-neopentyl amide acid maleate are obtained, decomposing at about 227° C.

*Analysis.*—Calculated for $C_{25}H_{31}N_3O_5$: C, 66.20; H, 6.89; N, 9.27. Found: C, 66.32; H, 7.15; N, 9.22.

The mother liquors from the crystallization of the $d$-lysergic acid N-neopentyl amide acid maleate contain $d$-isolysergic acid N-neopentyl amide acid maleate which is converted to the free base by the procedure of Example 1, and is purified by chromatography over basic alumina and then by crystallization of the eluted material from ethyl acetate. Crystalline $d$-isolysergic acid N-neopentyl amide melts with decomposition at about 230–232° C.

EXAMPLE 29

*Preparation of d-lysergic acid N-cyclopentyl amide*

Following the procedure of Example 2, 0.052 mol of cyclopentyl amine are reacted with 0.01 mol of the mixed anhydride of $d$-lysergic and trifluoroacetic acids and the resulting amide mixture is treated with maleic acid to convert the amide bases to the corresponding maleate salts, one of which crystallizes from acetone. A yield of 550 mg. of crystalline $d$-lysergic acid N-cyclopentyl amide acid maleate, decomposing at about 216° C., is obtained as a first crop.

*Analysis.*—Calculated for $C_{25}H_{29}N_3O_5$: C, 66.52; H, 6.47; N, 9.31. Found: C, 66.26; H, 6.57; N, 9.39.

The mother liquor from the crystallization of $d$-lysergic acid N-cyclopentyl amide acid maleate contains $d$-isolysergic acid N-cyclopentyl amide acid maleate, which is treated according to the method of Example 1 to convert it to the free base, and the free base is purified chromatographically over the basic alumina. Elution with 300 ml. of 9:1 benzene-chloroform yields solid material after evaporation of the eluting solvents. Recrystallization of this solid from benzene gives 590 mg. of crystalline $d$-isolysergic acid N-cyclopentyl amide decomposing at about 223° C.

EXAMPLE 30

*Preparation of d-lysergic acid N-dl-trans-2-hydroxy-cyclohexyl amide*

The procedure of Example 12 is followed, except that 52 millimols of dl-trans-2-hydroxycyclohexyl amine are used as the reactant amine. The process leads to isolation of a crude product containing both lysergic acid hydroxycyclohexyl amide and the corresponding amino ester, which latter is rearranged by treating the mixture with alcoholic sodium hydroxide, to form exclusively the desired hydroxy amide, as in Example 12. $d$-Lysergic acid N-$dl$-trans-2-hydroxycyclohexyl amide thus obtained is converted to the corresponding acid maleate salt by dissolving it in a minimum amount of dry acetone and adding a solution of maleic acid in acetone. There is immediate precipitation of the crystalline acid maleate salt of $d$-lysergic acid N-$dl$-trans-2-hydroxycyclohexyl amide, which is isolated by filtration and dried in air. $d$-Lysergic acid N-$dl$-trans-2-hydroxycyclohexyl amide acid maleate decomposes at about 235° C. The yield of crystalline material is about 580 mg.

*Analysis.*—Calculated for $C_{26}H_{31}N_3O_6$: C, 64.87; H, 6.49; N, 8.73. Found: C, 64.63; H, 6.69; N, 8.37.

EXAMPLE 31

*Preparation of d-lysergic acid N-dl-cis-2-hydroxy-cyclohexyl amide*

The procedure of Example 30 is followed, except that $dl$-cis-2-hydroxycyclohexyl amine is used as the reactant amine. The $d$-lysergic acid N-$dl$-cis-2-hydroxycyclohexyl amide obtained is likewise converted to the acid maleate salt, which precipitates in crystalline form and is recovered by filtration. After drying in air, $d$-lysergic acid N-$dl$-cis-2-hydroxycyclohexyl amide acid maleate decomposes at about 228° C. The yield is about 350 mg.

*Analysis.*—Calculated for $C_{26}H_{31}N_3O_6$: C, 64.87; H, 6.49; N, 8.73. Found: C, 64.58; H, 6.54; N, 8.36.

EXAMPLE 32

*Preparation of d-lysergic acid N-L-threo-1,2-dimethylethanol amide*

The procedure of Example 12 is followed, except that L-threo-2-aminobutan-3-ol is used as the reactant amine and 0.01 mol of $d$-lysergic acid is used to prepare the mixed anhydride of d-lysergic and trifluoroacetic acids. The process results in the preparation of d-lysergic acid N-L-threo-1,2-dimethylethanol amide acid maleate in a yield of about 350 mg., and decomposing at about 194–196° C.

Analysis.—Calculated for $C_{24}H_{29}N_3O_6$: C, 63.28; H, 6.42; N, 9.23. Found: C, 63.08; H, 6.75; N, 8.95.

An analogous preparation, using the corresponding D-threo-2-aminobutan-3-ol, yields d-lysergic acid N-D-threo-1,2-dimethylethanol amide acid maleate decomposing at about 226° C.

Analysis.—Calculated for $C_{24}H_{29}N_3O_6$: C, 63.28; H, 6.42; N, 9.23. Found: C, 63.52; H, 6.79; N, 9.14.

EXAMPLE 33

*Preparation of d-lysergic acid N-dl-trans-2-hydroxycyclopentyl amide*

The procedure of Example 12 is repeated, except that 2.47 g. of d-lysergic acid are converted into a mixed anhydride with trifluoroacetic acid and this mixed anhydride is reacted with 4.85 g. of dl-trans-2-hydrocyclopentyl amine dissolved in acetonitrile. The purified reaction product is rearranged with aqueous alcoholic sodium hydroxide. The d-lysergic acid N-dl-trans-2-hydroxycyclopentyl amide formed is isolated as such and is then converted to the corresponding acid maleate salt. After crystallization from acetone, d-lysergic acid N-dl-trans-2-hydroxycyclopentyl amide acid maleate, which decomposes at about 215° C., is obtained in a yield of about 370 mg.

Analysis.—Calculated for $C_{25}H_{29}N_3O_6$: C, 64.22; H, 6.25; N, 8.99. Found: C, 63.95; H, 6.44; N, 8.82.

The d-isolysergic acid N-dl-trans-2-hydroxycyclopentyl amide acid maleate which is formed in the process remains in the mother liquors from crystallization of the corresponding d-lysergic acid amide salt from acetone and is converted to the corresponding free base by the method of Example 1. The d-isolysergic acid N-dl-trans-2-hydroxycyclopentyl amide is purified chromatographically using a column of basic alumina according to the method of Example 3. There are finally obtained 320 mg. of d-isolysergic acid N-dl-trans-2-hydroxycyclopentyl amide which after crystallization from acetone, melts at about 208–210° C. with decomposition.

d-Lysergic acid N-dl-cis-2-hydroxycyclopentyl amide is analogously prepared.

EXAMPLE 34

*Preparation of d-lysergic acid o-methylanilide*

The procedure of Example 16 is repeated, except that o-toluidine is used as the reactant amine. The crude product is crystallized from benzene, and is separated chromatographically on a column of basic alumina, using a 4:1 benzene-chloroform solvent mixture for development of the chromatogram. The first 250 ml. fraction of eluate is evaporated to dryness and yields 430 mg. of d-isolysergic acid o-methylanilide melting at about 225° C. with decomposition after crystallization from acetone. Further elution with 25 ml. of the same eluant, followed by 250 ml. of a 1:1 benzene-chloroform solvent mixture, yields a residue of d-lysergic acid o-methylanilide after evaporation of the eluting solvent. After solution of the residue in acetone and addition of maleic acid, there is obtained a precipitate of d-lysergic acid o-methylanilide acid maleate. The d-lysergic acid o-methylanilide acide maleate is filtered off and after drying decomposes at about 230° C.; a yield of 430 mg. is recovered.

Analysis.—Calculated for $C_{27}H_{27}N_3O_5$: C, 68.48; H, 5.75; N, 8.88. Found: C, 68.12; H, 5.78; N, 9.14.

EXAMPLE 35

*Preparation of d-lysergic acid N-L-erythro-1,2-dimethylethanol amide*

The procedure of Example 32 is carried out except that 9.25 g. of L-erythro-2-aminobutan-3-ol are used as the reactant amine and 5.36 g. of d-lysergic acid are used to prepare the mixed anhydride. After treatment of the crude product with aqueous alcoholic sodium hydroxide to convert any amino ester to the corresponding hydroxy amide, by the said procedure, the product comprising the mixed d-lysergic and d-isolysergic acid N-L-erythro-1,2-dimethylethanol amides is obtained in chloroform solution. Upon evaporation of the chloroform, fine needle-like crystals of d-lysergic acid N-L-erythro-1,2-dimethylethanol amide appear. The volume of the solvent is further decreased to about 15 ml. by evaporation and is then chilled, and the crystalline precipitate is filtered off and dried in air. A yield of about 1.17 g. of d-lysergic acid N-L-erythro-1,2-dimethylethanol amide, melting at about 148–152° C. with decomposition, is thus obtained. About 920 mg. of this material are converted to the corresponding acid maleate salt in acetone solution. After crystallization from acetone, filtration and drying, d-lysergic acid N-L-erythro-1,2-dimethylethanol amide acid maleate decomposes at about 222° C.

Analysis.—Calculated for $C_{24}H_{29}N_3O_6$: C, 63.28; H, 6.42; N, 9.23. Found: C, 63.33; H, 6.58; N, 9.09.

The mother liquor from the crystallization of d-lysergic acid N-L-erythro-1,2-dimethylethanol amide from chloroform is evaporated to a viscous residue, which contains the corresponding d-isolysergic acid amide. Crystallization of the residue from ethyl acetate yields about 1.5 g. of d-isolysergic acid N-L-erythro-1,2-dimethylethanol amide, melting at about 177–178° C. with decomposition.

EXAMPLE 36

*Preparation of d-lysergic acid N-cycloheptyl amide*

The procedure of Example 18 is repeated, except that 11.8 g. of cycloheptyl amine are used as the reactant amine and 5.36 g. of d-lysergic acid are used to prepare the mixed anhydride. The d-lysergic acid N-cycloheptyl amide acid maleate produced is crystallized from acetone, and when heated decomposes at about 245° C. A total amount of 1.35 g. of crystalline material is obtained.

Analysis.—Calculated for $C_{27}H_{33}N_3O_5$: C, 67.62; H, 6.94; N, 8.76. Found: C, 67.77; H, 7.19; N, 9.09.

The mother liquor from the crystallization of d-lysergic acid N-cycloheptyl amide contains the corresponding d-isolysergic acid amide acid maleate. The d-isolysergic N-cycloheptyl amide acid maleate is converted to the free base by the method of Example 1, and is purified chromatographically over a column of basic alumina using 600 ml. of a 17:3 benzene-chloroform solvent mixture as the eluant. After removal of the solvents from the resulting eluate and recrystallization from acetone, 870 mg. of d-isolysergic acid N-cycloheptyl amide are obtained, melting at about 180–182° C. with decomposition.

EXAMPLE 37

*Preparation of d-isolysergic acid N-2-pyridyl amide*

The procedure of Example 2 is repeated except that 0.02 mol of the mixed anhydride of d-lysergic and trifluoroacetic acids are prepared and 0.104 mol of 2-aminopyridine are used as the reactant amine. About 6.07 g. of impure d-isolysergic acid N-2-pyridyl amide are isolated. Paper strip chromatography shows this material to contain only one Van Urk positive substance.

About 5.8 g. of this material are dissolved in 150 ml. of a 1:1 chloroform-benzene solvent mixture and are chromatographed over basic alumina according to the procedure outlined in Example 3. The chromatogram is developed with the same solvent mixture. The first 600 ml. of eluate contain no solid material, but evaporation to small volume of the next 710 ml. of eluate, taken in four fractions, yields a total of 2.92 g. of d-isolysergic acid N-2-pyridyl amide melting at about 235–242° C. More material is isolated from the mother liquors. Recrystallization of material melting in the above range from ethanol yields pure d-isolysergic acid N-2-pyridyl amide melting at about 244–246° C. with decomposition. $[\alpha]_D^{26} = +488.7°$ (c.=0.212 in isopropanol).

*Analysis.*—Calculated for $C_{21}H_{20}N_4O$: C, 73.23; H, 5.85; N, 16.27. Found: C, 73.18; H, 6.00; N, 16.43.

EXAMPLE 38

*Preparation of d-lysergic acid hexamethylene imide*

A preparation is carried out according to the procedure of Example 2, except that 0.11 mol of hexamethylene imine is reacted with 0.02 mol of the mixed anhydride of *d*-lysergic acid trifluoroacetic acids. The mixture of lysergic acid amides which is the reaction product is purified by chromatography over basic alumina following the method of Example 3. Thus, the crude product is dissolved in 200 ml. of a 17:3 benzene-chloroform mixture and chromatographed over 220 g. of basic alumina. *d*-Lysergic acid hexamethylene imide is eluted from the column by passage of a 3:1 benzene-chloroform mixture and is recovered in amorphous form by evaporation of the eluting solvent to dryness. *d*-Isolysergic acid hexamethylene imide is next eluted from the column by passage of 500 ml. of chloroform in three fractions after prior passage of about 5 liters of benzene-chloroform eluant mixtures containing gradually increasing amounts of chloroform. Evaporation of the chloroform eluate to dryness followed by crystallization of the residue from acetone yields 1.24 g. of pure *d*-isolysergic acid hexamethylene imide melting at about 184–185° C. with decomposition.

*Analysis.*—Calculated for $C_{22}H_{27}N_3O$: C, 75.17; H, 8.32; N, 11.96. Found: C, 75.60; H, 7.95; N, 12.30.

EXAMPLE 39

*Preparation of acid addition salts of lysergic acid N-isopropyl amide*

*d*-Lysergic acid N-isopropyl amide prepared according to the procedure of Example 2 and melting at about 200° C. is employed for the preparation of acid addition salts as follows: 0.1 mol of *d*-lysergic acid N-isopropyl amide is dissolved in 25 ml. of absolute ethanol, and a solution of an amount equal to one equivalent of oxalic acid in 25 ml. of ethanol is added thereto. The mixture is thoroughly agitated and allowed to stand at room temperature for about one hour, and is then evaporated to dryness. The residue is *d*-lysergic acid N-isopropyl amide oxalate.

Following the same procedure, equivalent amounts of *d*-lysergic acid N-isopropyl amide and of stearic, benzoyl tartaric, citric, benzoic, phthalic and salicylic acids are employed. *d*-Lysergic acid N-isopropyl amide stearate, *d*-lysergic acid N-isopropyl amide benzoyl tartrate, *d*-lysergic acid N-isopropyl amide citrate, *d*-lysergic acid N-isopropyl amide benzoate, *d*-lysergic acid N-isopropyl amide phthalate, and *d*-lysergic acid N-isopropyl amide salicylate, respectively, are obtained.

The other lysergic acid amides disclosed herein can be employed in place of *d*-lysergic acid N-isopropyl amide, to form the corresponding acid addition salts in an entirely analogous manner.

EXAMPLE 40

The procedure of Example 2 is followed except that racemic lysergic acid is employed for the preparation of the mixed anhydride of lysergic and trifluoroacetic acids. There is isolated a mixture of *dl*-lysergic acid N-isopropyl amide and *dl*-isolysergic acid N-isopropyl amide. The mixture is dissolved in methanol and treated with an excess of maleic acid. The resulting solution is seeded with a crystal of *d*-lysergic acid N-isopropyl amide acid maleate and dry ether is added. A crystalline precipitate of *dl*-lysergic acid N-isopropyl amide acid maleate forms which melts at about 180–190° C. after filtering off and drying. The mother liquors from the crystallization contain *dl*-isolysergic acid N-isopropyl amide acid maleate which is converted to the free base by the method of Example 1. The base is obtained in a 3:1 benzene-chloroform solution and is placed on a chromatographic column containing basic alumina. Development of the chromatogram with 3:1 benzene-chloroform yields an eluate which when evaporated to dryness, leaves a residue of *dl*-isolysergic acid N-isopropyl amide. When crystallized from benzene, *dl*-isolysergic acid N-isopropyl amide is obtained as prisms melting at about 145–175° C. with decomposition.

In the same manner, the procedure is repeated, except that 9,10-dihydro lysergic acid and 9,10-dihydro isolysergic acid are employed for the preparation of the mixed anhydride of lysergic acid and trifluoroacetic acid. In each case 9,10-dihydro lysergic acid N-isopropyl amide and 9,10-dihydro isolysergic acid N-isopropyl amide, respectively, are produced. When isolysergic acid is used in the reactions, an equilibrium mixture of lysergic acid N-isopropyl amide and isolysergic acid N-isopropyl amide is produced, which can be separated into the individual isomers by the methods hereinbefore described.

I claim:

1. A compound of the group consisting of a base and nontoxic acid addition salts thereof, the said base being represented by the formula $$RCO\text{---}R_1$$

wherein RCO— represents the lysergoyl radical and $R_1$ represents an amido radical of the group consisting of isopropylamido, sec-butylamido, neopentylamido, t-butylamido, monocycloalkylamido of 5 to 8 carbon atoms, monohydroxy monocycloalkylamido of 5 to 8 carbon atoms, lower alkyl anilido, lower alkoxy anilido, halo anilido, methyl propyl amido, diisopropylamido, lower alkoxyalkylamido, pyrrolidido, lower alkyl pyrrolidido, morpholido, piperidido, lower alkyl piperidido, N-pyridylamido, N' lower alkyl-piperazido, 1,1-dimethylethanolamido, 2,2-dimethylethanolamido, 1,2-dimethylethanolamido, 1-hydroxy-3-methylbutyl-2-amido and 1-hydroxy-2-methylbutyl-2-amido radicals.

2. Lysergic acid morpholide.
3. Lysergic acid N-sec-butyl amide.
4. Lysergic acid N-cyclopentyl amide.
5. Lysergic acid pyrrolidide.
6. Lysergic acid piperidide.
7. Lysergic acid N-2-hydroxycyclopenthylamide.
8. Lysergic acid N-1,2-dimethylethanolamide.

References Cited in the file of this patent

UNITED STATES PATENTS

| | | |
|---|---|---|
| 2,090,430 | Stoll | Aug. 17, 1937 |
| 2,265,207 | Stoll | Dec. 9, 1941 |
| 2,438,259 | Stoll | Mar. 23, 1948 |
| 2,736,728 | Pioch | Feb. 28, 1956 |